United States Patent [19]

Broussoux et al.

[11] Patent Number: 4,708,989

[45] Date of Patent: Nov. 24, 1987

[54] POLYMER BASED DIELECTRIC MATERIAL WITH HIGH DIELECTRIC PERMITTIVITY

[75] Inventors: Dominique Broussoux, Marcoussis; François Micheron, Gif sur Yvette, both of France

[73] Assignee: Thomson-CSF, Paris, France

[21] Appl. No.: 875,729

[22] Filed: Jun. 18, 1986

[30] Foreign Application Priority Data

Jun. 21, 1985 [FR] France ............................. 85 09500

[51] Int. Cl.$^4$ ............................................. C08L 27/16
[52] U.S. Cl. .................................................... 525/199
[58] Field of Search ........................................ 525/199

[56] References Cited

U.S. PATENT DOCUMENTS

| | | | |
|---|---|---|---|
| 3,719,371 | 10/1973 | Nersasian | 525/199 |
| 3,723,577 | 3/1973 | Stivers | 525/199 |
| 3,864,228 | 2/1975 | Rossetti | 525/199 |
| 4,530,970 | 7/1985 | Morozumi et al. | 525/199 |
| 4,530,971 | 7/1985 | Geri et al. | 525/199 |
| 4,560,737 | 12/1985 | Yamamoto et al. | 525/88 |
| 4,612,351 | 9/1986 | Caporiccio et al. | 525/199 |

FOREIGN PATENT DOCUMENTS

| | | |
|---|---|---|
| 2311803 | 12/1976 | France. |
| 52-027597 | 3/1977 | Japan .................................. 525/199 |
| 84/03250 | 8/1984 | World Intel. Prop. O. . |

OTHER PUBLICATIONS

Chemical Abstracts, vol. 99, No. 18, 31 Oct. 1983, pp. 24, No. 140761t, Columbus, Ohio.
Chemical Abstracts, vol. 99, No. 26, 26 Dec. 1983, pp. 23, No. 213226j, Columbus, Ohio.

*Primary Examiner*—Carman J. Seccuro
*Attorney, Agent, or Firm*—Oblon, Fisher, Spivak, McClelland, & Maier

[57] ABSTRACT

The invention relates to dielectric materials formed from polymers and having high dielectric permittivity.

The invention provides alloys of ferroelectric polymers with different Curie temperatures, these alloys optimizing the dielectric properties over an extensive temperature and frequency range.

11 Claims, 7 Drawing Figures

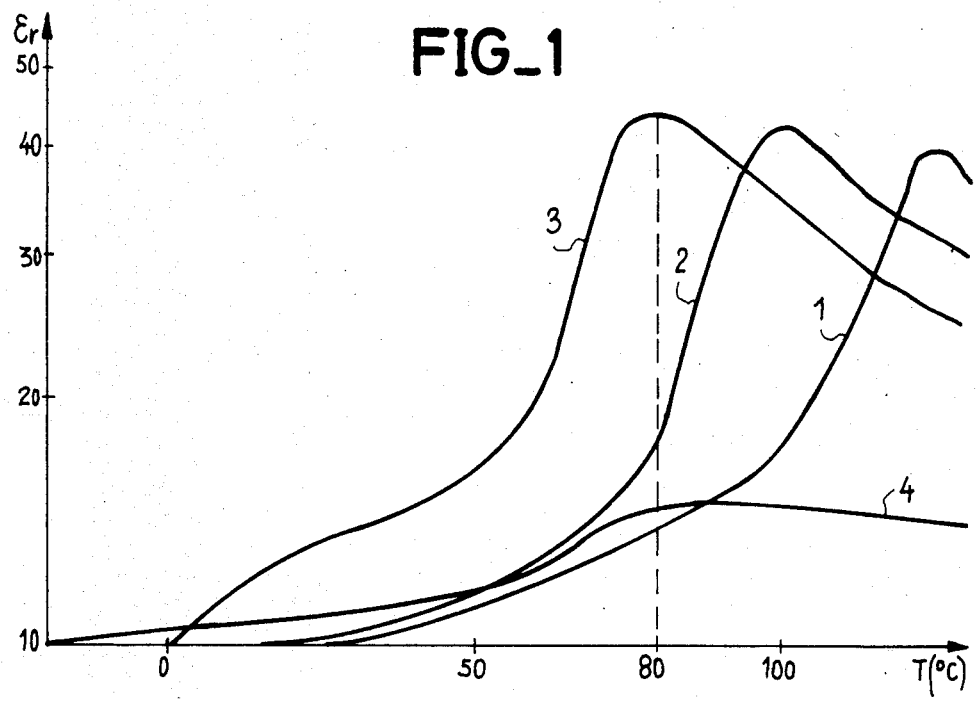
FIG_1
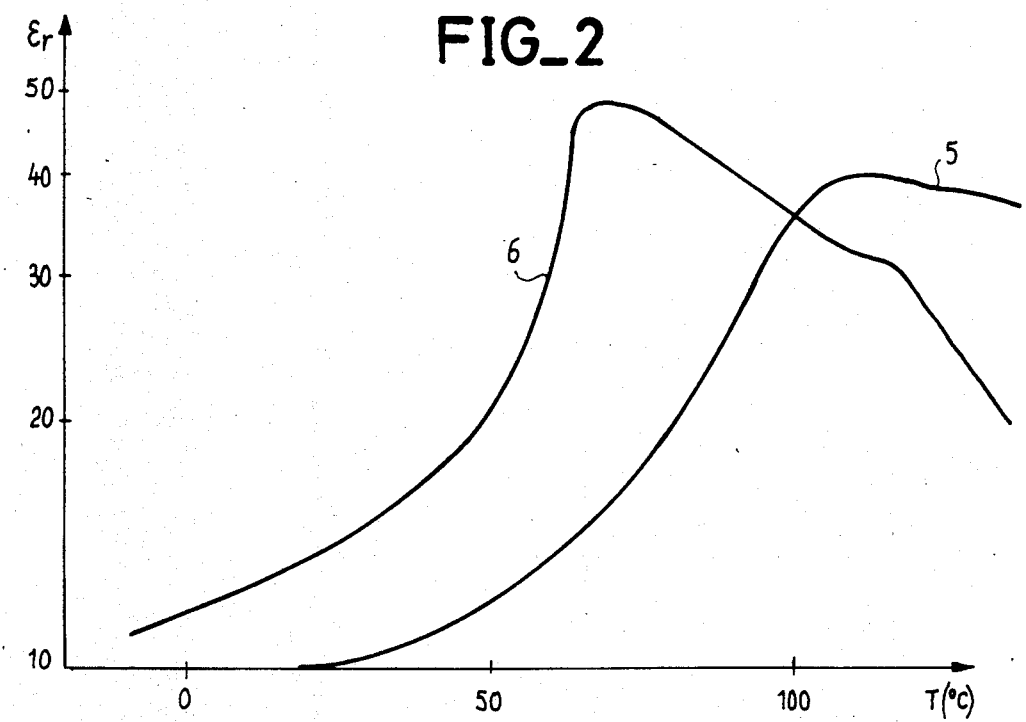
FIG_2

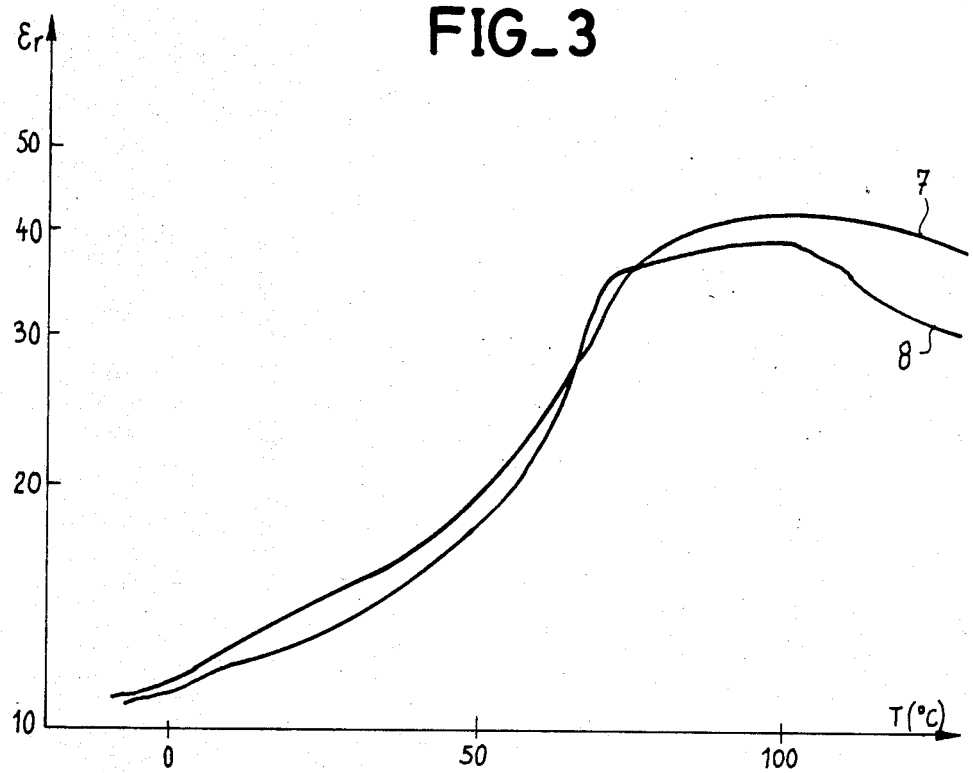
FIG_3
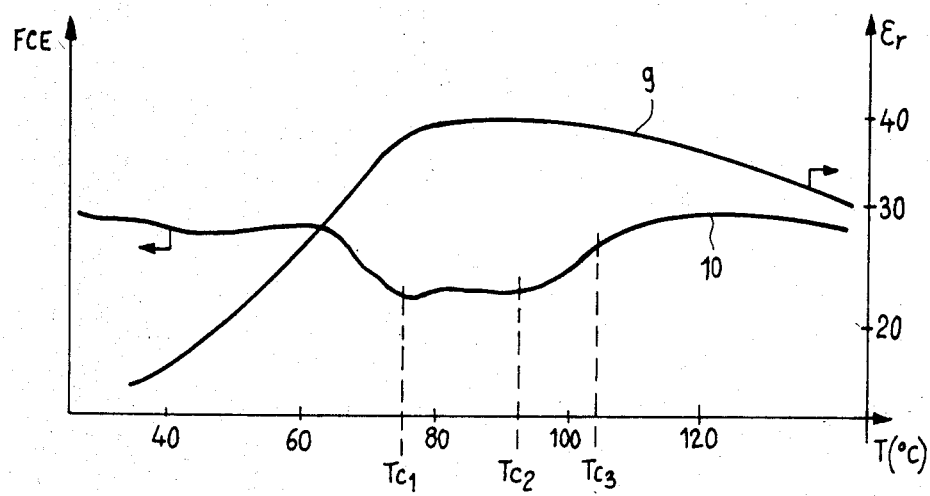
FIG_4

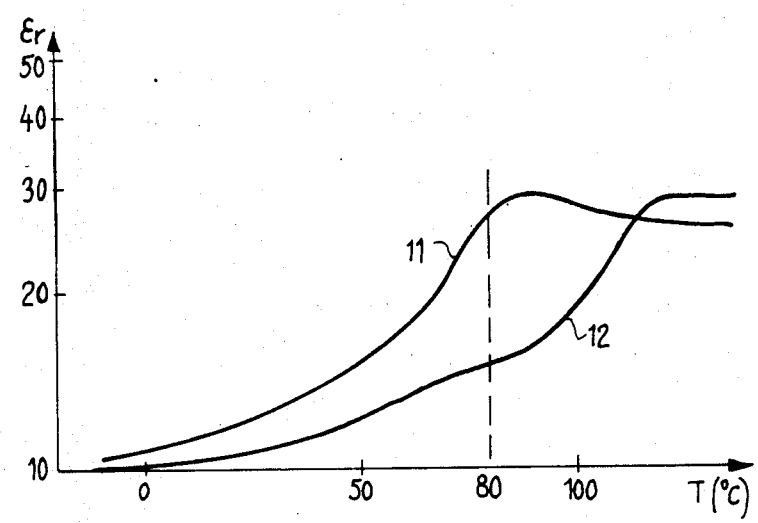
FIG_5
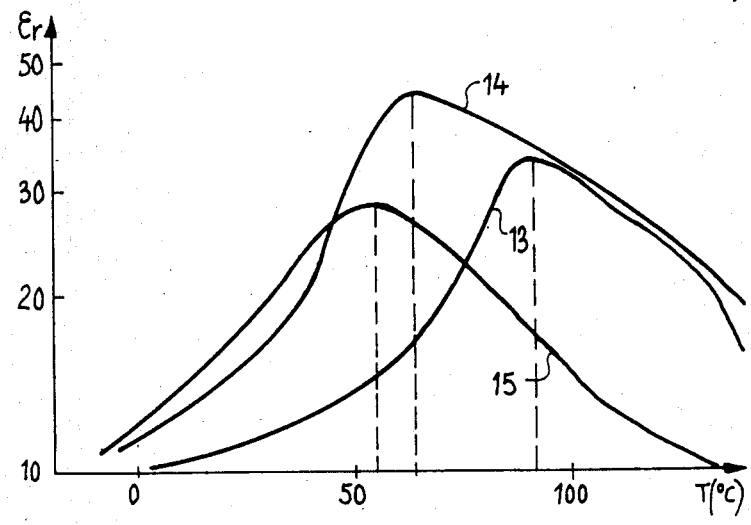
FIG_6
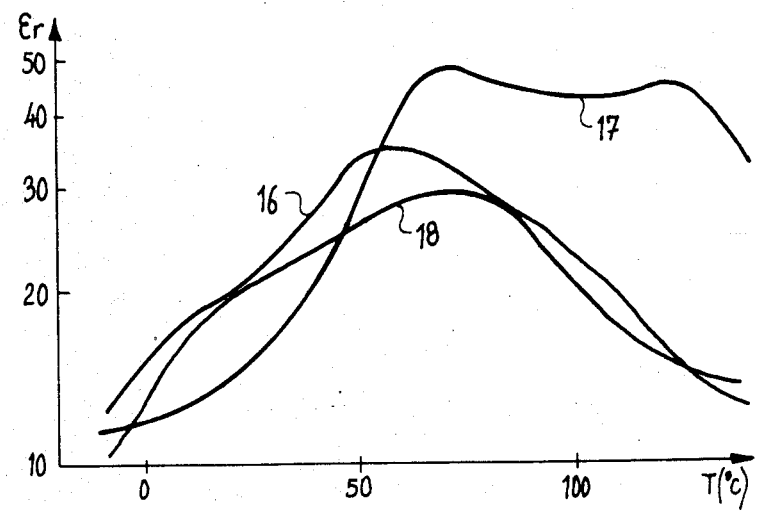
FIG_7

POLYMER BASED DIELECTRIC MATERIAL WITH HIGH DIELECTRIC PERMITTIVITY

BACKGROUND OF THE INVENTION

The present invention relates to dielectric materials formed from polymers having a high dielectric permittivity.

A dielectric material often used for manufacturing capacitors is vinylidene polyfluoride ($PVF_2$) which has interesting dielectric properties. It may be obtained in the form of thin films. However, because of technological difficulties, it is difficult to obtain films having a thickness less than 5 $\mu$m. This imposes limitations on the voluminal capacity of $PVF_2$ capacitors since this capacity is inversely proportional to the square of the thickness of the dielectric. Efforts have then been made, using different treatments, to improve the values of the dielectric permittivity of $PVF_2$ for temperature frequency ranges as extensive as possible. It is also desirable for the optimum temperature range in use to be close to the ambient temperature.

Mechanical uniaxial or biaxial stretching increases the value of the permittivity or dielectric constant by about 20%. The relative dielectric constant then passes for $PVF_2$ from 10 to 12. Stretching induced by rolling allows values between 13 and 15 to be obtained.

Another solution consists in mixing the $PVF_2$ with ferroelectric powders having high dielectric constants (between 1000 and 2000). This technique, appearing as a simple and efficient means for increasing the value of the constant $\epsilon r$ of the dielectric up to about 40 or 50, has the major drawback of definitely preventing films from being obtained of a thickness less than 50 $\mu$m.

Another possiblity consists in using copolymers rather than homopolymers, for example vinylidine fluoride and trifluoroethylene copolymers, written $P(VF_2—TrFE)$ or else $P(VF_2—VF_3)$. This copolymer has the particularity of presenting the ferroelectric type phase transition at a temperature higher than the ambient temperature and which is a function of the ratio $VF_2/VF_3$. Nevertheless the temperature range in which the dielectric constant is high ($\epsilon r$ between 40 and 50) is limited.

More recently we have seen the appearance of terpolymers, for example the terpolymer of vinylidene fluoride, trifluoroethylene and hexafluoropropene written $P(VF_2—TrFE—HFP)$ or the terpolymer of vinylidene fluoride, trifluorethylene and trifluorochloroethylene written $P(VF_2—TrFE—TrFC1E)$. These terpolymers again present a ferroelectric character but the transitions at the Curie temperature are diffused. The result is that the temperature range for which the material has a high dielectric constant is enlarged with respect to that of the copolymers, but still insufficiently.

To overcome these drawbacks, the invention provides ferroelectric polymer alloys at different Curie temperatures, these alloys optimizing the dielectric properties over an extensive temperature-frequency range. These alloys may be based on copolymers, on a homopolymer and one or more copolymers or else based on terpolymers.

SUMMARY OF THE INVENTION

The invention provides a polymer based dielectric material with high dielectric constant, formed of an alloy of ferroelectric polymers with different Curie temperatures. The ferroelectric polymers may be vinylidene fluoride and trifluoroethylene copolymers $P(VF_2—VF_3)$.

The alloy may comprise two or three copolymers of this type.

The alloy may also be formed from a homopolymer such as $PVF_2$ and a copolymer such as $P(VF_2—VF_3)$.

The ferroelectric polymers may be terpolymers which have the advantage of enlarging the high dielectric constant zone when the temperature varies.

The alloys may be obtained by mixing two terpolymers or by mixing a terpolymer with a copolymer.

BRIEF DESCRIPTION OF THE DRAWINGS

The invention will be better understood and other advantages will be clear from the following description with reference to the accompanying Figures in which:

FIG. 1 is a diagram relating to different polymers of the prior art,

FIGS. 2 and 3 are diagrams showing the evolution of the relative dielectric constant as a function of the temperature for materials of the invention, FIG. 4 is a diagram representing the exothermic heat flow for a material of the invention, FIGS. 5 and 7 are diagrams representing the evolution of a dielectric constant with the temperature for materials of the invention, and FIG. 6 is a diagram illustrating the variation of the dielectric constant with the temperature for terpolymers.

DETAILED DESCRIPTION OF THE INVENTION

In what follows, the term polymer will be taken in the wide sense, that is to say covering homopolymers, copolymers, terpolymers, etc.

The different alloys will be formed by mixing the different components in the molten phase in a heating roller mixer for a temperature of about 200° C. The mixtures are then pressed in the form of thin films from 100 to 120 microns in thickness by compression at a temperature of about 180° C. and cooled by dipping in water so as to limit crystallization. Then the samples are covered with metallizations, for example made from aluminium, on their main faces so as to be able to measure their dielectric constant $\epsilon r$ and their loss factor tg $\delta$. The measurements will be made for a frequency of 100 Hz and over a temperature range varying from $-10°$ C. to $140°$ C.

FIG. 1 is a diagram showing the evolution of a dielectric constant $\epsilon r$ as a function of the temperature expressed in degrees Celsius for different polymers of the prior art. They are vinylidene fluoride and trifluoroethylene copolymers, i.e. $P(VF_2—VF_3)$ for different compositions. Curve 1 relates to a copolymer written 70/30, that is to say in which the proportion of vinylidene fluoride is 70% and trifluoroethylene 30% in molar proportions of the constituents. Curve 2 relates to the same type of copolymer but for a proportion 60/40. Similarly curve 3 relates to a composition with proportions 50/50. As can be very well seen in this diagram, these copolymers have a ferroelectric type phase transition at a temperature higher than the ambient temperature and which depends on the proportions of its constituents. This transition gives rise to a maximum of the dielectric constant $\epsilon r$ which is relatively high (around 40). This transition is accompanied by a crystalline structure change from the polar phase to the non-polar phase. It will be assumed that the dielectric constant maximum corresponds to the Curie temperature.

It can be seen from the diagram of FIG. 1 that the dielectric constant maximum is situated at a relatively high temperature (80° C. for the composition 50/50) and that this maximum only exists for a fairly restricted temperature range. The dielectric constant decreases rapidly when the temperature passes from the Curie temperature to the ambient temperature. For example, the composition 60/40 passes from about 42 for 100° C. to about 10 for 20° C.

By way of comparison, curve 4 shows the variation of $\epsilon r$ as a function of the temperature in the case of vinylidene polyfluoride. It can be seen that it is possible to substantially increase the dielectric constant using copolymers but for high temperatures and for restricted temperature ranges.

FIG. 2 is a diagram showing the variation of the dielectric constant $\epsilon r$ with the temperature for alloys of the invention. They are alloys between vinylidene fluoride and trifluoroethylene copolymers of different concentrations. Alloy A, corresponding to curve 5, contains 50% by weight of a 60/40 composition and 50% of a 70/30 composition. This alloy shows a plateau in the dielectric behavior with $\epsilon r$ of the order of 40 from 110° C. even though this value is only from 10 to 25° C. The amplitude of the plateau only varies by a few units in a temperature range of 40° or so. It is an interesting characteristic although the plateau appears at relatively high temperatures.

Alloy B, corresponding to curve 6, contains 70% by weight of a 50/50 composition and 30% of a 60/40 composition. This alloy presents, about 70° C., a maximum of 45 for $\epsilon r$. The constant then decreases to 30 for a temperature of the order of 120° C. The maximum dielectric constant is high for a medium temperature but the plateau is still fairly narrow.

For these alloys, the loss factor is less than 0.03 up to 90° C.

FIG. 3 is a diagram showing the variation of the dielectric constant $\epsilon r$ with the temperature for other alloys of the invention. They are alloys formed from three vinylidene fluoride and ethylene trifluoride copolymers having compositions 50/50, 60/40 and 70/30 taken in different proportions.

Alloy C, corresponding to curve 7, has an equal proportion by weight for the three compositions. Alloy D, corresponding to curve 8, has a proportion by weight of 45% for the 50/50 composition, 35% for the 60/40 composition and 20% for the 70/30 composition. It will be noted, for the two mixtures, the presence of a plateau beginning at about the Curie temperature of the 50/50 composition, namely 75° C. For alloy C, the plateau has a fairly constant value ($\epsilon r$ between 35 and 40) for a wide temperature range (between 75 and 140° C.). It is the small percentage of the 70/30 composition in alloy D (see curve 8) which causes a drop of the dielectric constant for temperatures higher than 105° C.

For this type of alloy, the dielectric losses are less than 0.04 up to 110° C.

FIG. 4 is a diagram showing the exothermic heat flow FCE for alloy C. Curve 9 represents the variation of the dielectric constant $\epsilon r$ as a function of the temperature. It corresponds to curve 7 in FIG. 3. Curve 10 shows the exothermic heat flow of this alloy as a function of the temperature. The measurement of this heat flow was made by differential scanning calorimetry. Curve 10 shows, of the temperature range corresponding to the level sketch of curve 9, a trough where several significant temperatures can be read. We thus read the three temperatures $Tc_1$, $Tc_2$ and $Tc_3$. The first two are visible in curve 10 since they correspond to heat flow minimums. The third corresponds to an inflexion point of curve 10. This curve is interesting in that it well illustrates the fact that the mixture of several ferroelectric copolymers with different Curie temperatures gives an alloy whose Curie transition is a combination of the different Curie transitions. The spread of the transition between $Tc_1$ (about 75° C.) and $Tc_3$ (about 105° C.) will be noted. $Tc_1$ corresponds to the Curie temperature of the 50/50 composition and $Tc_3$ to the Curie temperature of 70/30 composition. $Tc_2$ corresponds to the Curie temperature of the 60/40 composition. It may thus be anticipated that the width of the substantially constant dielectric constant plateau with the temperature will depend on the greater or lesser difference existing between the Curie temperatures of the different compositions. For the plateau to become close to the ambient temperature, the Curie temperature of one of the constituents must then approximate it.

FIG. 5 is a diagram showing the variation of the dielectric constant $\epsilon r$ with the temperature for other alloys of the invention. They are alloys formed from the homopolymer $PVF_2$ and vinylidene fluoride and trifluoroethylene copolymers. These alloys have been shown by the notation: $PFV_2 + P(VF_2/VF_3)$. The type of copolymer (60/40 or 70/30 for example) used in the mixture is determinant for the temperature positioning of the plateau and for the value of $\epsilon r$ on this plateau. Thus, in FIG. 5, the dielectric constant maximum ($\epsilon r \simeq 30$) is observed from 80° C. for alloy E containing 40% by weight of $PVF_2$, for 60% of a 60/40 copolymer. Alloy E is shown in FIG. 5 by the curve 11.

Alloy F formed of 60% by weight of $PVF_2$ and 40% of 70/30 copolymer has a dielectric constant maximum (about 30) from 110° C. (see curve 12).

The diffraction of X-rays from these mixtures does not shown any phase $\beta$ crystallation of the $PVF_2$ but a phase $\alpha$ crystallisation, thermodynamically the most stable phase.

FIG. 6 is a diagram showing the variation of the dielectric constant $\epsilon r$ with the temperature in the case of terpolymers. Curve 13 is relative to a terpolymer $T_1$ of trifluoroethylene, vinylidene fluoride and hexafluoropropene HFP which will be written $P(VF_3-VF_2-HFP)$ and whose proportions in moles in the mixture are respectively 35, 60 and 5%. Curves 14 and 15 are relative to terpolymers (respectively $T_2$ and $T_3$) of trifluoroethylene, vinylidene fluoride and trifluorochloroethylene which will be written $P(VF_3-VF_2-TrFC1E)$. For curve 14, the mole proportions of the parts in the mixture are respectively 35, 60 and 5%. For curve 15, the mole proportions are respectively 35, 55 and 10%. It can be seen that for these terpolymers the maxima of $\epsilon r$ correspond to lower temperatures than for the copolymers of FIG. 1 and for values of $\epsilon r$ of the same order of size. The absence of a plateau will be unfortunately noted as for the copolymers.

FIG. 7 is a diagram showing the variation of the dielectric constant $\epsilon r$ with the temperature in the case of alloys of terpolymers with other terpolymers or with a copolymer. Curve 16 relates to an alloy G formed of 30% by weight of $T_1$ and 70% of $T_3$. Alloy G has a dielectric constant maximum ($\epsilon r = 35$) about 55° C. at the Curie temperature observed on the terpolymer $T_3$ alone. The high value of εr (about 20) will however be noted for the temperature 20° C.

Alloy H is formed from 30% by weight of T₁ and 70% of T₂ and corresponds to curve 17. This curve has a plateau over an extensive temperature range (between 60 and 130° C.), of high value and reltively constant (εr from 45 to 50). Under these conditions, this alloy is particularly interesting.

Alloy I is formed of 70% by weight of terpolymer T₃ and 30% of copolymer VF₂—VF₃ in proportions of 60/40 (60% by weight of VF₂ for 40% by weight of VF₃). This alloy corresponds to curve 18. This curve has no extensive plateau but the alloy I allows a material to be obtained with a dielectric constant between 20 and 30 for a temperature range extending from 20° to 100° C. and whose maximum is situated at about 80° C.

The present invention is not limited to the above mentioned examples. It applies to all ferroelectric polymer alloys.

Furthermore, still within the scope of the invention these materials may be used for other applications. By controlled polarization, they may acquire piezoelectric or pyroelectric properties, characteristic of ferroelectrics with diffused transitions.

What is claimed is:

1. A polymer based dielectric material having a high dielectric constant, comprising:
   an alloy of at least two ferroelectric polymers each having a different Curie temperature, said alloy being composed of the following combinations of polymers:
   1. a homopolymer of vinylidene fluoride and at least one copolymer of vinylidene fluoride and trifluoroethylene;
   2. at least two copolymers of vinylidene fluoride and trifluoroethylene;
   3. at least two terpolymers, each comprising vinylidene fluoride and trifluoroethylene monomers and another fluorinated unsaturated monomer; or
   4. a copolymer of (2) above and a terpolymer of (3) above.

2. The dielectric material as claimed in claim 1, wherein the alloy is formed of 50% by weight of a copolymer comprising 60 mole % vinylidene fluoride and 40 mole % trifluoroethylene, and 50% of a copolymer comprising 70 mole % vinylidene fluoride and 30 mole % trifluoroethylene.

3. The dielectric material as claimed in claim 1, wherein the alloy is formed of 30% by weight of a copolymer comprising 60 mole % vinylidene fluoride and 40 mole % trifluoroethylene, and 70% of a copolymer comprising 50 mole % vinylidene fluoride and 50 mole % trifluoroethylene.

4. The dielectric material as claimed in claim 1, wherein said alloy is formed by a third by weight of a copolymer comprising 50 mole % vinylidene fluoride and 50 mole % trifluoroethylene, a third of a copolymer comprising 60 mole % vinylidene fluoride and 40 mole % trifluoroethylene, and a third of a copolymer comprising 70 mole % vinylidene fluoride and 30 mole % trifluoroethylene.

5. The dielectric material as claimed in claim 1, wherein said alloy is formed of 45% by weight of a copolymer comprising 50 mole % vinylidene fluoride and 50 mole % trifluoroethylene, of 35% of a copolymer comprising 60 mole % vinylidene fluoride and 40 mole % trifluoroethylene and of 20% of a copolymer comprising 70 mole % vinylidene fluoride and 30 mole % trifluoroethylene.

6. The dielectric material as claimed in claim 1, wherein said alloy is formed of 40% by weight of vinylidene fluoride homopolymer and 60% of a copolymer comprising 60 mole % vinylidene fluoride and 40 mole % of trifluoroethylene.

7. The dielectric material as claimed in claim 1, wherein said alloy is formed of 60% by weight of vinylidene fluoride homopolymer and 40% of a copolymer comprising 70 mole % vinylidene fluoride and 30 mole % trifluoroethylene.

8. The dielectric material as claimed in claim 1, wherein said alloy is formed of 30% by weight of a terpolymer comprising 35 mole % trifluoroethylene, 60 mole % vinylidene fluoride and 5 mole % hexafluoropropene and 70% of a terpolymer comprising 35 mole % trifluoroethylene, 55 mole % vinylidene fluoride and 10 mole % trifluorochloroethylene.

9. The dielectric material as claimed in claim 1, wherein said alloy is formed of 30% by weight of a terpolymer comprising 35 mole % trifluoroethylene, 60 mole % vinylidene fluoride and 5 mole % hexafluoroethylene, and 70 mole % of a terpolymer comprising 35 mole % trifluoroethylene, 60 mole % vinylidene fluoride and 5 mole % trifluorochloroethylene.

10. The dielectric material as claimed in claim 1, wherein said alloy is formed of 70% by weight of a terpolymer comprising 35 mole % trifluoroethylene, 55 mole % vinylidene fluoride and 10 mole % trifluorochloroethylene and 30% of a copolymer comprising 60 mole % vinylidene fluoride and 40 mole % trifluoroethylene.

11. A method of preparing a dielectric film comprising:
    forming a film of a dielectric material from an alloy of at least two ferroelectric polymers each having a different Curie temperature, said alloy being composed of the following combinations of polymers:
    1. a homopolymer of vinylidene fluoride and at least one copolymer of vinylidene fluoride and trifluoroethylene;
    2. at least two copolymers of vinylidene fluoride and trifluoroethylene;
    3. at least two terpolymers, each comprising vinylidene fluoride and trifluoroethylene monomers and another fluorinated unsaturated monomer; or
    4. a copolymer of (2) above and a terpolymer of (3) above.

* * * * *